(12) United States Patent
Bychkov et al.

(10) Patent No.: US 8,447,020 B2
(45) Date of Patent: May 21, 2013

(54) SPEED-DIAL AND SPEED-CONTACT WITH PREDICTIVE LOGIC

(75) Inventors: Eyal Bychkov, Hod Hasharon (IL); Tal Engelstein, Ramat Gan (IL); Yair Leshem, Tel Aviv (IL); Uri Ron, Tel Aviv (IL); Ron Levy, Savyon (IL); Hagit Perry, Herzilya (IL); Yohan Yehouda Cohen, Hod Hasharon (IL); Yuval Refaeli, Kefar Saba (IL)

(73) Assignee: Google Inc., Mountain View, CA (US)

( * ) Notice: Subject to any disclaimer, the term of this patent is extended or adjusted under 35 U.S.C. 154(b) by 1014 days.

(21) Appl. No.: 12/183,081

(22) Filed: Jul. 31, 2008

(65) Prior Publication Data
US 2009/0041224 A1    Feb. 12, 2009

Related U.S. Application Data

(60) Provisional application No. 60/964,233, filed on Aug. 9, 2007.

(51) Int. Cl.
*H04M 3/42* (2006.01)
(52) U.S. Cl.
USPC .................................. 379/201.01; 379/216.01
(58) Field of Classification Search
USPC .......... 379/216, 252, 216.01, 201.01, 433.04, 379/433.06; 455/418, 557, 419, 420, 556.1, 455/556.2, 559, 575.1, 575.8
See application file for complete search history.

(56) References Cited

U.S. PATENT DOCUMENTS

| | | | |
|---|---|---|---|
| 5,628,055 A | 5/1997 | Stein | |
| 6,201,867 B1 | 3/2001 | Koike | |
| 6,243,578 B1 | 6/2001 | Koike | |
| 6,516,202 B1 | 2/2003 | Hawkins et al. | |
| 6,690,947 B1 | 2/2004 | Tom | |
| 6,898,283 B2 | 5/2005 | Wycherley et al. | |
| 6,999,792 B2 | 2/2006 | Warren | |
| 7,085,542 B2 | 8/2006 | Dietrich et al. | |

(Continued)

FOREIGN PATENT DOCUMENTS

| | | |
|---|---|---|
| EP | 1760645 A1 | 3/2007 |
| EP | 1871075 A1 | 12/2007 |

(Continued)

OTHER PUBLICATIONS

Bridle, R. and McCreath, E., Inducing Shortcuts on a Mobile Phone Interface, Proc. 11th Int. Conf. on Intelligent User Interfaces, Jan. 29-Feb. 1, 2006, pp. 327-329, Sydney, Australia; http://portal.acm.org/citation.cfm?id=1111449.1111526.

*Primary Examiner* — Amal Zenati
(74) *Attorney, Agent, or Firm* — Soquel Group LLC

(57) ABSTRACT

A method for predicting to whom a phone call is being made, including identifying at least one state parameter for a mobile phone, and at least one weighting factor corresponding to the at least one state parameter for each identified state parameter, predicting one or more likely contacts that a user of the mobile phone is calling, given that the user is making a phone call, based on the identified state parameter, for each likely contact, assigning a combined weight to the likely contact based on the at least one weighting factor, ranking the likely contacts according to the combined weights, and facilitating making a phone call to one or more of the likely contacts with the highest rankings. A mobile phone is also described and claimed.

38 Claims, 4 Drawing Sheets

U.S. PATENT DOCUMENTS

| | | |
|---|---|---|
| 7,194,257 B2 * | 3/2007 | House et al. .................. 455/418 |
| 7,194,285 B2 | 3/2007 | Tom |
| 7,266,391 B2 | 9/2007 | Warren |
| 7,574,661 B2 * | 8/2009 | Matsuura et al. ............. 715/745 |
| 7,580,363 B2 * | 8/2009 | Sorvari et al. ................. 370/252 |
| 2004/0203949 A1 | 10/2004 | Nielsen et al. |
| 2004/0233930 A1 | 11/2004 | Colby, Jr. |
| 2005/0070225 A1 | 3/2005 | Lee |
| 2005/0159184 A1 | 7/2005 | Kerner et al. |
| 2006/0035632 A1 | 2/2006 | Sorvari et al. |
| 2006/0105722 A1 | 5/2006 | Kumar |
| 2006/0141990 A1 | 6/2006 | Zak et al. |
| 2006/0141991 A1 | 6/2006 | House et al. |
| 2006/0156209 A1 | 7/2006 | Matsuura et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0161404 A1 | 7/2007 | Yasujima et al. |
| 2008/0026794 A1 | 1/2008 | Warren |
| 2008/0140886 A1 | 6/2008 | Izutsu |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

Predicted Phone Call or Message Recipient based on State Parameters

| State Parameter | Weight | Predicted Phone Call / Message Recipient |
|---|---|---|
| Date & Time | W1 | Early or late ⇒ family or friend<br>During work hours ⇒ business contact |
| Location | W2 | Address of person ⇒ person<br>Address of site ⇒ site |
| Scheduler | W3 | Meeting ⇒ meeting attendant |
| Phone Profile | W4 | Meeting Profile ⇒ meeting attendant |
| Open data files | W5 | Document ⇒ document author<br>Picture ⇒ person in picture<br>Multimedia ⇒ sender |
| Previous user actions | W6 | Turn phone on ⇒ spouse<br>Call sports buddy ⇒ call another sports buddy |
| Social Network | W7 | Event ⇒ social contact attending same event |
| Communications Network | W8 | Member of network group |
| Jacket | W9 | Person using a similar jacket |

FIG. 1

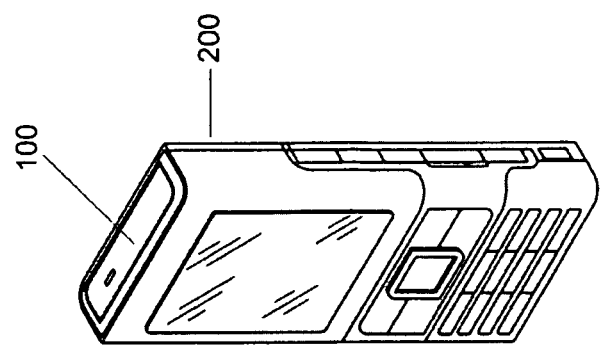
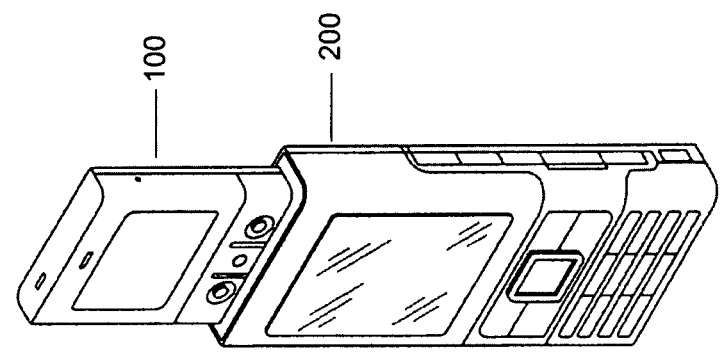
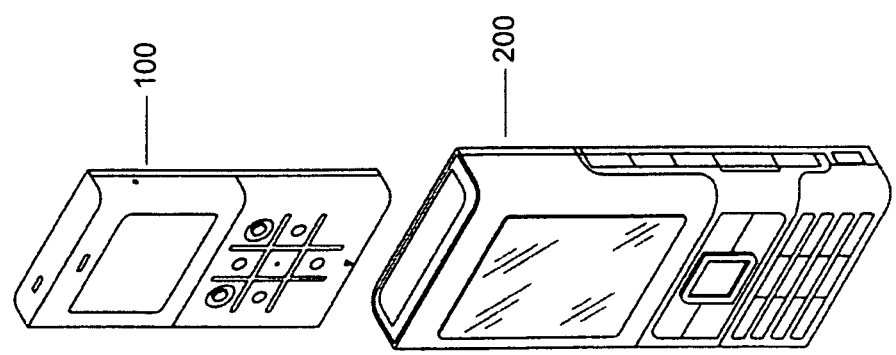
FIG. 2

SPEED-DIAL AND SPEED-CONTACT WITH PREDICTIVE LOGIC

CROSS REFERENCES TO RELATED APPLICATIONS

This application claims benefit of U.S. Provisional Application No. 60/964,233, entitled CALL SHUFFLING, filed on Aug. 9, 2007 by inventors Itay Sherman, Eyal Bychkov, Hagit Perry and Uri Ron.

FIELD OF THE INVENTION

The field of the present invention is mobile phones.

BACKGROUND OF THE INVENTION

Especially for phones with small keypads, speed-dialing enables a user to make a phone call with a one-click or a two-click action. Conventionally, there are two generic types of speed-dialing. The oldest type of speed-dialing, referred to as key assignment speed-dialing, enables a user to assign contacts to various numerical one-key or two-key combinations, and is thus inherently limited to up to 10 or up to 100 contacts, respectively. By pressing the one- or two-key combination for a specific contact, a user activates dialing of the contact's complete phone number.

A second type of speed-dialing, referred to as scroll and select speed-dialing, enables a user to scroll back and forth through an entire list of contacts. When a desired contact name appears in the list, the user activates dialing of the contact's phone number by selecting the contact name.

Both of these speed-dialing actions have drawbacks when a user has accumulated a large number of contacts, say several hundred contacts. Key assignment speed-dialing cannot support each of the large number of contacts. Scroll and select dialing is cumbersome for a large list of contacts.

It would thus be of advantage to combine predictive logic with speed-dialing, so that the contact phone numbers accessible by speed-dialing are dynamically generated, based on predictive logic.

SUMMARY OF THE DESCRIPTION

Aspects of the present invention provide a mobile phone with speed-dialing and speed-contact circuitry using predictive logic. When a user begins making a phone call, the predictive logic dynamically determines one or more likely phone numbers that the user is going to call, and enables the user to speed-dial a selected one of the likely phone numbers. Similarly, when a user begins composing a message, such as an e-mail message, an SMS message or an MMS message, the predictive logic dynamically determines one or more likely recipients to whom the user is going to send his message, and enables the user to speed-contact a selected one or more of the likely recipients.

In an embodiment of the present invention, the predictive logic is based upon one or more current state parameters for the mobile phone. State parameters include inter alia a current date & time, a current location, previous actions performed by the mobile phone in response to user commands, and a jacket cover that houses the mobile phone.

Embodiments of the present invention are of advantage for speed-dialing of phone calls and of video calls. Embodiments of the present invention are also of advantage for speed designation of recipients for messages, including inter alia e-mail messages, SMS messages and MMS messages.

There is thus provided in accordance with an embodiment of the present invention a method for predicting to whom a phone call is being made, including identifying at least one state parameter for a mobile phone, and at least one weighting factor corresponding to the at least one state parameter for each identified state parameter, predicting one or more likely contacts that a user of the mobile phone is calling, given that the user is making a phone call, based on the identified state parameter, for each likely contact, assigning a combined weight to the likely contact based on the at least one weighting factor, ranking the likely contacts according to the combined weights, and facilitating making a phone call to one or more of the likely contacts with the highest rankings.

There is additionally provided in accordance with an embodiment of the present invention a mobile phone, including a state identifier for identifying at least one state parameter for a mobile phone, and at least one weighting factor corresponding to the at least one state parameter, in response to the mobile phone detecting that a user is making a phone call, a contact predictor, coupled with the state identifier, for predicting, for each state parameter identified by the state identifier, one or more likely contacts that the user is calling, a contact likelihood ranker, coupled with the state identifier and with the contact predictor, for (i) assigning a combined weight to each of the likely contacts predicted by the contact predictor, based on the at least one weighting factor, and (ii) ranking the likely contacts according to the combined weights, and a call facilitator, coupled with the contact likelihood ranker, for facilitating making a phone call to one or more of the likely contacts with the highest rankings.

There is further provided in accordance with an embodiment of the present invention a method for predicting to whom a message is being composed, including identifying at least one state parameter for a mobile communicator, and at least one weighting factor corresponding to the at least one state parameter, for each identified state parameter, predicting one or more likely recipients that a user of the mobile communicator is writing to, given that the user is composing a message, based on the identified state parameter, for each likely recipient, assigning a combined weight to the likely recipient based on the at least one weighting factor, ranking the likely recipients according to the combined weights, and facilitating designating one or more of the likely recipients with the highest rankings as recipients of the message being composed by the user.

There is yet further provided in accordance with an embodiment of the present invention a mobile communicator, including a message editor for composing a message to be sent from a mobile communicator to one or more recipients, a state identifier, coupled with the message editor, for identifying at least one state parameter for the mobile communicator, and at least one weighting factor corresponding to the at least one state parameter, in response to the message editor detecting that a user is composing a message, a recipient predictor, coupled with the state identifier, for predicting, for each state parameter identified by said state identifier, one or more likely recipients that the user is writing to, a recipient likelihood ranker, coupled with the state identifier and with the recipient predictor, for (i) assigning a combined weight to each of the likely recipients predicted by the recipient predictor, based on the at least one weighting factor, and (ii) ranking the likely recipients according to the combined weights, and a message facilitator, coupled with the recipient likelihood ranker, for facilitating designating one or more of the likely recipients with the highest rankings as being recipients of the message being composed by the user.

BRIEF DESCRIPTION OF THE DRAWINGS

The present invention will be more fully understood and appreciated from the following detailed description, taken in conjunction with the drawings in which:

FIG. 1 is simplified table for predicting whom a user is going to call or send a message to, given that the user is making a phone call or composing a message, respectively, based on state parameters for a mobile phone that he uses, in accordance with an embodiment of the present invention;

FIG. 2 is an illustration of a wireless communicator being inserted into a jacket, in accordance with an embodiment of the present invention;

DETAILED DESCRIPTION

Figure 3:
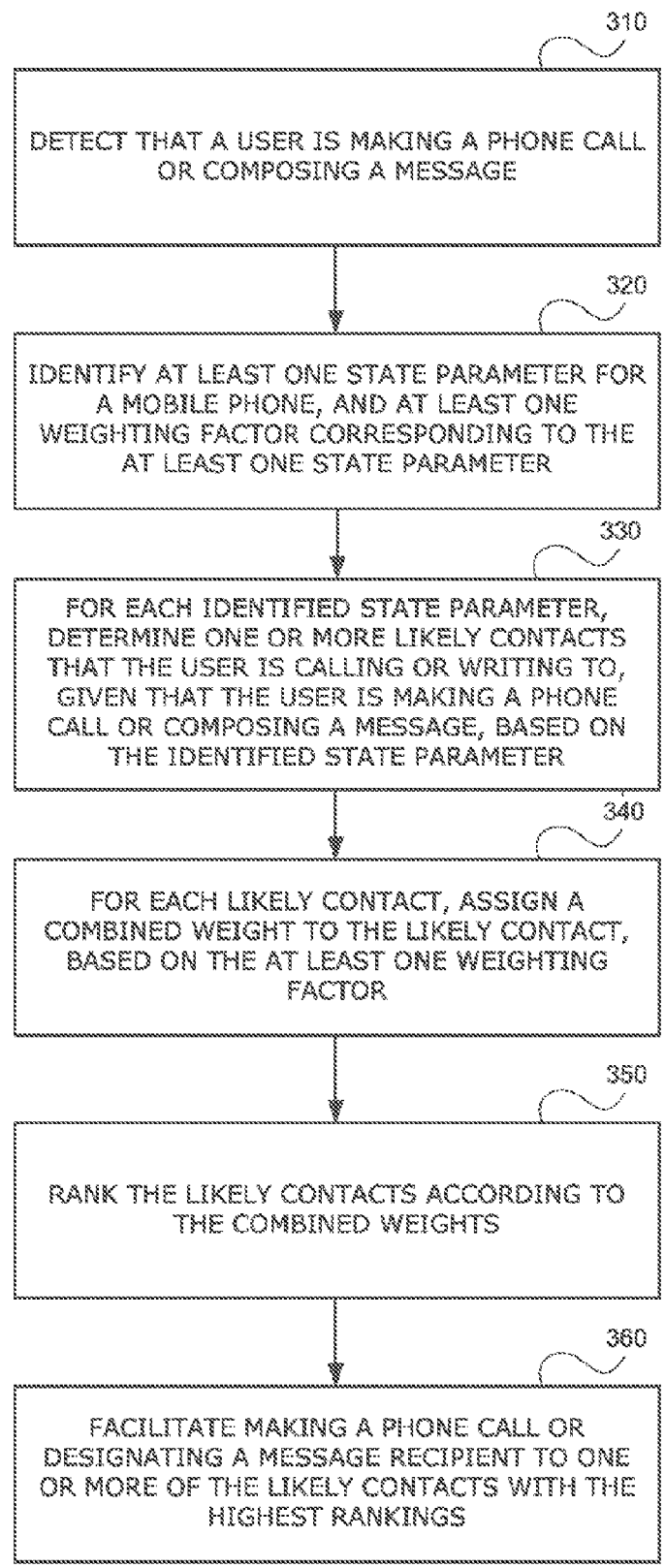
FIG. 3 is a simplified flowchart of a method for predicting to whom a user is making a call or to whom a user is composing a message, in accordance with an embodiment of the present invention.

Aspects of the present invention relate to a method and system for speed-dialing based on predictive logic used to predict whom a user, making a phone call, desires to call. The predictive logic dynamically determines one or more likely phone numbers that the user desires to dial, and sets up speed-dialing for dialing one of the likely phone numbers that the user selects. Aspects of the present invention also relate to a method and system for speed-contact based on predictive logic used to predict to whom a user, composing a message, such as an e-mail message, an SMS message or an MMS message, desires to send the message to. The predictive logic dynamically determines one or more likely recipients that the user desires to send the message to, and sets up speed-contact for designating one or more of the likely recipients that the user selects.

Reference is now made to FIG. 1, which is a simplified table for predicting whom a user is going to call or send a message to, given that the user is making a phone call or composing a message, respectively, based on state parameters for a mobile phone that he uses, in accordance with an embodiment of the present invention. Each line of the table includes a state parameter for the mobile phone, a corresponding weight, and a predicted person or site that the user is going to call and send a message to, as follows.

Date & Time

Date & Time is generally accessible via a real-time clock in the mobile phone. For example, when the user travels to and from his work site, he often makes calls to family and friends; when the user is at work he often makes calls to colleagues at work. As such, during early or late hours of weekdays, such as 8:00 AM-9:00 AM or 6:00 PM-7:00 PM, if the user is making a call or composing a message, then he is likely going to contact a family member or a friend, and during work hours, such as 9:00 AM-6:00 PM, if the user is making a call or composing a message, then he is likely going to contact a work colleague. Such speed-dial and speed-contact is automatically configured based on user preferences, and based on configurable items in the user's calendar, including inter alia working days and hours, and types of appointments in the calendar.

Location

In accordance with an embodiment of the present invention, the user's mobile phone stores locations that were manually entered by the user, including inter alia contact addresses and points of interest, and pre-designated locations, including inter alia restaurants, hotels and shops. If the user is making a call or composing a message, then is he likely going to contact people or sites at locations nearby to where he is currently located, or towards which he is traveling. Nearby sites are identified inter alia by online information services, such as Google® Maps (http://maps.google.com) developed by Google, Inc. of Mountainview, Calif., which provide data about many points of interest around the world.

Schedule

In accordance with an embodiment of the present invention, the user's mobile phone stores the user's schedule, including meetings. If the user is making a call or composing a message, then he is likely going to contact a meeting attendant for an upcoming meeting.

Phone Profile

In accordance with an embodiment of the present invention, the user's mobile phone has one or more profile settings, such as General and Meeting. If his mobile phone is set to a Meeting profile, and if the user is making a call or composing a message, then he is likely going to contact a meeting attendant. Similarly, when his mobile phone is set to another profile, and if the user is making a call or composing a message, then it is he is likely going to contact a person or a site related to such profile.

Data Files

In accordance with an embodiment of the present invention, a user's data files are stored on his mobile phone. Further in accordance with an embodiment of the present invention, data files have attributes of contact people associated the files. An image file, for example, may have tags for people in the image. A document file, for example, may have tags for the author(s) of the document. A media file, for example, may have a tag for the person who sent the file. When a user is browsing a specific file, it is likely that he will call or send a message to a person related to the file.

Action Sequences

Users often perform a plurality of actions in sequence, and thus prior actions are helpful in predicting to whom a current phone call is being made or to whom a message being composed will be sent. E.g., if a user calls a sports buddy and then makes a subsequent call, then he is likely going to call another sports buddy afterwards. When a user first turns his mobile phone on, he is likely going to call or send a message to his closest person, such as his spouse.

Social Network

The user may participate in one or more social networks. In accordance with an embodiment of the present invention, likely contacts are also drawn from social network information, which are generally accessible via presence servers. Examples of presence servers are http://twitter.com operated by Twitter, Inc. of San Francisco, Calif., and http://www.gysii.com, operated by GeoSolutions B.V., of Amsterdam. Users may have personal information, such as events they are attending or their current location published to their friends. If the user is making a call or composing a message when he is attending a specific event, or when he is visiting a specific location, the user is likely going to contact one of his social contacts who is attending the same event or visiting the same location.

Communication Network

In accordance with an embodiment of the present invention, the user's mobile phone may be connected to one of a plurality of networks. The specific network to which the user's phone is connected is helpful in predicting to whom a current phone call is being made or to whom a current message is being composed for.

Aspects of the present invention relate to a small modular wireless communicator that connects to a plurality of other electronic devices and enables the other devices to communicate wirelessly. The modular wireless communicator of the present invention operates both in standalone mode as a wireless phone, and also in conjunction with devices to which it is connected.

The devices to which the wireless communicator connects may be jacket covers, which include user interface controls for operating the wireless communicator; or they may be electronic devices having other functionality including inter alia cameras, televisions, media players, game consoles, navigation systems and portable digital assistants (PDAs). For ease of exposition, these devices to which the wireless communicator connects are referred to herein generically as jackets. When the wireless communicator is connected to a jacket, the jacket enriches the capabilities of the wireless communicator, and the wireless communicator enriches the capabilities of the jacket. In this regard, reference is made to FIG. 2, which is an illustration of a wireless communicator 100 being inserted into a jacket 200, in accordance with an embodiment of the present invention.

In accordance with an embodiment of the present invention, the jacket cover of the user's mobile phone is also used to predict to whom the user is making a phone call.

Jacket Cover

If a specific branded jacket is currently housing the user's mobile phone, and if the user is currently making a phone call or composing a message, then he is likely contacting another user who owns or is currently using a similar jacket. Often jackets are designed for specific activities, such as clubbing or outdoors. A user generally has specific people associated with each specific activity, whom he typically calls or sends messages to during such activity. As such, when a jacket for a specific activity is housing the user's mobile phone and the user is currently making a phone call or composing a message, then he is likely calling or writing to someone associated with such activity. Moreover, people associated with specific activities can be inferred by saving most used numbers that the user calls or writes to with each jacket.

Behavior-Learning

In addition to the state parameters shown in FIG. 1, embodiments of the present invention include call/message history analysis for enabling the mobile phone to adaptively learn a user's behavior patterns and thus better predict who the user is going to call or going to send a message to, based on the mobile phone state parameters. In accordance with such behavior-learning embodiments, when a user selects a contact to call, or to designate as a message recipient, from a list of predicted contacts, the user's selection is logged and the weight assigned to this contact is dynamically updated accordingly.

Further in accordance with such behavior-learning embodiments, inbound and outbound communication with specific contacts are compared. For example, a disproportionate number of missed calls from a specific contact while a user is calling other contacts or making such other use of his mobile phone, indicates a reluctance of the user to speak with such contact, and a lower weight is then assigned to this contact.

Yet further in accordance with such behavior-learning embodiments, inter-relationships of state parameters are inferred.

Reference is now made to FIG. 3, which is a simplified flowchart of a method for predicting to whom a user is making a call or to whom a user is composing a message, in accordance with an embodiment of the present invention. The method of FIG. 3 is performed by a mobile phone operated by a user. At step 310 the mobile phone detects that the user is making a phone call or composing a message, such as an e-mail message, an SMS message or an MMS message. At step 320 the mobile phone identifies at least one state parameter for the mobile phone, such as the state parameters shown in FIG. 1, and at least one weighting factor corresponding to the at least one state parameter, such as the weights shown in FIG. 1.

For each identified state parameter, the mobile phone predicts, at step 330, one or more likely contacts that the user is calling, such as the likely contacts shown in FIG. 1, based on the identified state parameter. It will be appreciated by those skilled in the art that the same likely contact may be predicted based on several identified state parameters. For each likely contact predicted at step 330, the mobile phone assigns a combined weight thereto, at step 340, based on the at least one weighting factor identified at step 320.

At step 350 the mobile phone ranks the likely contacts according to the combined weights assigned at step 340. For example, based on FIG. 1, a user may make a phone call at 6:30 PM during a weekday and be located at a gym facility. Based on date & time, it is likely that the user is calling a friend or family member. Based on location, it is likely that the user is calling a sports buddy. The combined weights are used to rank these likelihoods.

At step 360 the mobile phone facilitates making a phone call or sending a message to one or more of the highest ranked likely candidates. The mobile phone may present the user with a list of the highest ranked likely candidates, and enable the user to dial one of the likely candidates, or to designate one or more of the likely candidates, by simply selecting his name from the list. Alternatively, the mobile phone may assign one- or two-key codes to the likely candidates, and enable the user to dial any one of the likely contacts by simply pressing the contact's assigned one- or two-key code, or by speaking the contact's assigned one- or two-key code.

Figure 4:
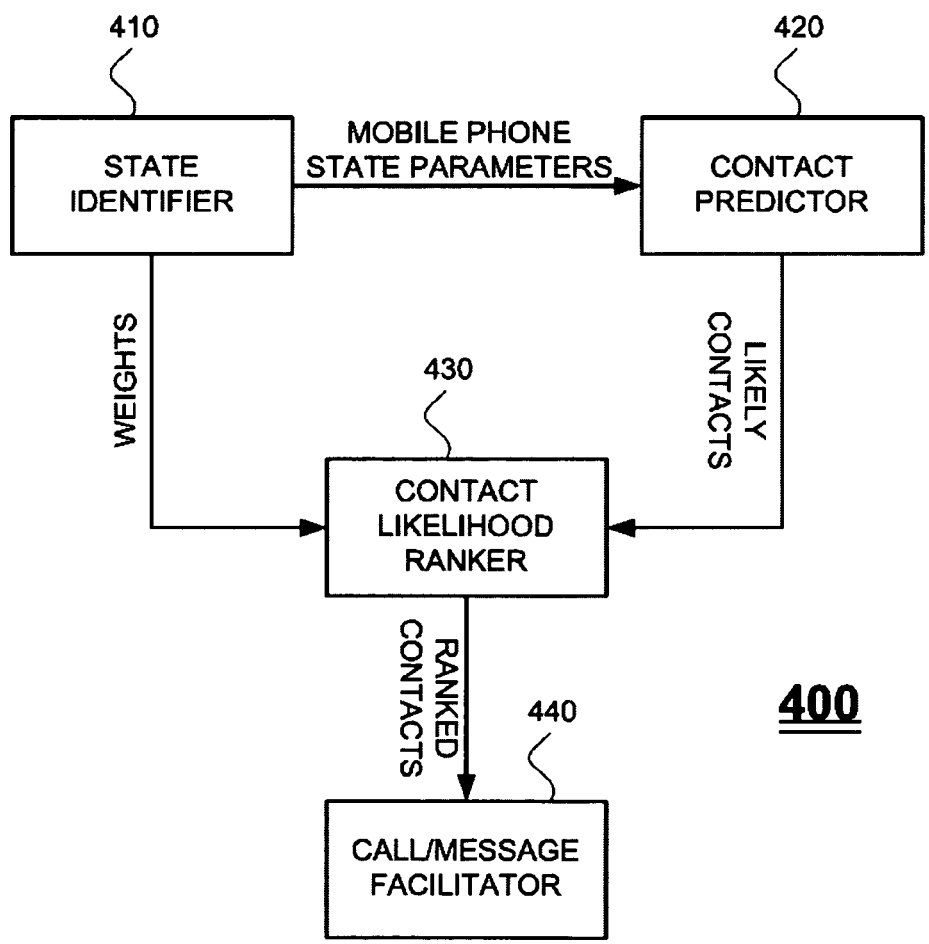
FIG. 4 is a simplified block diagram of a system for predicting to whom a user is making a call or to whom a user is composing a message, in accordance with an embodiment of the present invention.

Reference is now made to FIG. 4, which is a simplified block diagram of a mobile phone 400 that predicts to whom a user is making a call or to whom a user is composing a message, in accordance with an embodiment of the present invention. As shown in FIG. 4, mobile phone 400 includes four components: a state identifier 410, a contact predictor 420, a contact likelihood ranker 430, and a call/message facilitator 440. State identifier 410 identifies one or more current state parameters of mobile phone 400, such as the parameters listed in FIG. 1, in response to mobile phone 400 detecting that a user is making a phone call or composing a message, such as an e-mail message, an SMS message or an MMS message. State identifier further identifies weighting factors corresponding to the identified state parameters, such as the weights listed in FIG. 1.

Contact predictor 420 receives as input the current state parameters from state identifier 410, and produces as output one or more likely contacts to whom the user is making the phone call or to whom the user is composing the message. In one embodiment of the present invention, contact predictor 420 may employ a look-up table, such as the table listed in FIG. 1, to predict the likely contacts. Contact likelihood ranker 430 receives as inputs, for each of the identified state parameters, the corresponding weighting factor from state identifier 410 and the one or more likely contacts from contact predictor 420. It will be appreciated by those skilled in the art that the same likely contact may be predicted for multiple state parameters. As such, contact likelihood ranker 430 generates combined weights for each of the likely contacts, and produces a ranked list of the likely contacts according to their combined weights.

Call/message facilitator 440 receives as input the ranked list of likely contacts from contact likelihood ranker 430, and facilitates calling one or more of the highest ranked contacts, or designating one or more of the highest ranked contacts as being a recipient for the message the user is composing. Call/message facilitator 440 may present a display list of one or more of the highest ranked contacts for the user to select from, and enable making a phone call to a contact, or designating a contact as being a message recipient, in response to selection of the contact from the display list.

In reading the above description, persons skilled in the art will realize that there are many apparent variations that can be applied to the methods and systems described. Thus it may be appreciated that although the description hereinabove relates to predicting to whom a phone call is being made and to predicting to whom a message is being written, embodiments of the present invention apply generally to other forms of communication, including inter alia video calls.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for predicting by a user's mobile phone to whom a phone call is being made based on a type of jacket cover housing the mobile phone, comprising:
    identifying, by a user's mobile phone, at least one state parameter for the mobile phone, wherein the mobile phone inserts into a plurality of jacket covers of various types, wherein each jacket cover is an electronic device enriching the capabilities of the mobile phone when the mobile phone is inserted inside the jacket cover, wherein each type of jacket cover is designated for a specific activity related to the user, and wherein the at least one state parameter comprises the type of jacket cover into which the mobile phone is currently inserted;
    when a jacket cover for a specific activity is currently housing the mobile phone and the user is currently making a phone call, then predicting by the mobile phone that the user is calling one or more contacts associated with that specific activity, based on the identified at least one state parameter; and
    facilitating the user's making a phone call to one or more of the predicted contacts.

2. The method of claim 1 wherein the at least one state parameter comprises a current date and time.

3. The method of claim 1 wherein the at least one state parameter comprises a current location of the mobile phone.

4. The method of claim 1 wherein the at least one state parameter comprises a scheduled meeting.

5. The method of claim 1 wherein the at least one state parameter comprises one or more data files currently being viewed by the user.

6. The method of claim 1 wherein the at least one state parameter comprises one or more previous actions performed by the mobile phone upon instruction from the user.

7. The method of claim 1 wherein the at least one state parameter comprises a network to which the mobile phone is connected.

8. The method of claim 1 wherein the at least one state parameter comprises a current profile setting of the mobile phone.

9. The method of claim 1 wherein said predicting comprises consulting at least one of the user's social networks.

10. The method of claim 1 wherein said facilitating comprises:
    presenting a scrollable display list of the predicted contacts; and
    dialing a contact's phone number in response to user selection of the contact from the display list.

11. The method of claim 1 wherein said facilitating comprises:
    presenting a list of key codes assigned to each of the predicted contacts; and
    dialing a contact's phone number in response to user pressing of the contact's assigned key code.

12. The method of claim 1 wherein said facilitating comprises:
    presenting a list of key codes assigned to each of the predicted contacts; and
    dialing a contact's phone number in response to user speaking of the contact's assigned key code.

13. A mobile phone with prediction to whom a phone call is being made based on a type of jacket cover housing the mobile phone, comprising:
    a state identifier for identifying at least one state parameter for a user's mobile phone, wherein the mobile phone inserts into any of a plurality of jacket covers of various types, wherein each jacket cover is an electronic device enriching the capabilities of the mobile phone when the mobile phone is inserted inside the jacket cover, wherein each type of jacket cover is designated for a specific activity related to the user, and wherein the at least one state parameter comprises the type of jacket cover into which the mobile phone is currently inserted;
    a contact predictor, coupled with said state identifier, for predicting, when a jacket cover for a specific activity is currently housing the mobile phone and the user is currently making a phone call, that the user is calling one or more contacts associated with that specific activity, based on the at least one identified state parameter; and
    a call facilitator, coupled with said contact predictor, for facilitating the user's making a phone call to one or more of the predicted contacts.

14. The mobile phone of claim 13 wherein the at least one state parameter comprises a current date and time.

15. The mobile phone of claim 13 wherein the at least one state parameter comprises a current location of the mobile phone.

16. The mobile phone of claim 13 wherein
    the at least one state parameter comprises a scheduled meeting.

17. The mobile phone of claim 13 wherein the at least one state parameter comprises one or more data files currently being viewed by the user.

18. The mobile phone of claim 13 wherein the at least one state parameter comprises one or more previous actions performed by the mobile phone upon instruction from the user.

19. The mobile phone of claim 13 wherein the at least one state parameter comprises a network to which the mobile phone is connected.

20. The mobile phone of claim 13 wherein the at least one state parameter comprises a current profile setting of the mobile phone.

21. The mobile phone of claim 13 wherein said contact predictor consults at least one of the user's social networks.

22. The mobile phone of claim 13 wherein said call facilitator (i) presents a scrollable display list of the predicted contacts, and (ii) dials a contact's phone number in response to user selection of a contact from the display list.

23. The mobile phone of claim 13 wherein said call facilitator (i) presents a list of key codes assigned to each of the predicted contacts, and (ii) dials a contact's phone number in response to user pressing of the contact's assigned key code.

24. The mobile phone of claim 13 wherein said call facilitator (i) presents a list of key codes assigned to each of the predicted contacts, and (ii) dials a contact's phone number in response to user speaking of the contact's assigned key code.

25. A method for predicting by a user's mobile communicator to whom a message is being composed based on a type of jacket cover housing the mobile communicator, comprising:
    identifying, by a user's mobile communicator, at least one state parameter for the mobile communicator, wherein the mobile communicator inserts into any of a plurality of jacket covers of various types, wherein each jacket cover is an electronic device enriching the capabilities of the mobile communicator when the mobile communicator is inserted inside the jacket cover, wherein each type of jacket cover is designated for a specific activity related to the user, and wherein the at least one state parameter comprises the type of jacket cover into which the mobile communicator is currently inserted;
    when a jacket cover for a specific activity is currently housing the mobile communicator and the user is currently composing a message, then predicting by the mobile communicator that the user is composing the message for one or more recipients associated with that specific activity, based on the identified at least one state parameter; and
    facilitating designating one or more of the predicted recipients as recipients of the message being composed by the user.

26. The method of claim 25 wherein the message being composed by the user is an e-mail message.

27. The method of claim 25 wherein the message being composed by the user is an SMS message.

28. The method of claim 25 wherein the message being composed by the user is an MMS message.

29. The method of claim 25 wherein said facilitating comprises:
    presenting a scrollable display list of the predicted recipients; and
    designating a recipient as being a recipient of the message being composed by the user, in response to user selection of the recipient from the display list.

30. The method of claim 25 wherein said facilitating comprises:
    presenting a list of key codes assigned to each of the predicted recipients; and
    designating a recipient as being a recipient of the message being composed by the user, in response to user pressing of the recipient's assigned key code.

31. The method of claim 25 wherein said facilitating comprises:
    presenting a list of key codes assigned to each of the predicted recipients; and
    designating a recipient as being a recipient of the message being composed by the user, in response to user speaking of the recipient's assigned key code.

32. A mobile communicator with prediction for whom a message is being composed based on a type of jacket cover housing the mobile communicator, comprising:
    a message editor for composing a message to be sent from a user's mobile communicator to one or more recipients;
    a state identifier for identifying at least one state parameter for the mobile communicator, wherein the mobile communicator inserts into any of a plurality of jacket covers of various types, wherein each jacket cover is an electronic device enriching the capabilities of the mobile communicator when the mobile communicator is inserted inside the jacket cover, wherein each type of jacket cover is designated for a specific activity related to the user, and wherein the at least one state parameter comprises the type of jacket cover into which the mobile communicator is currently inserted;
    a recipient predictor, coupled with said state identifier, for predicting, when a jacket cover for a specific activity is currently housing the mobile communicator and said message editor is currently composing a message, that said message editor is composing the message for one or more recipients associated with that specific activity, based on the at least one identified state parameter; and
    a message facilitator, coupled with said message editor and said recipient predictor, for facilitating a user's designating one or more of the likely predicted recipients as being recipients of the message being composed by said message editor.

33. The mobile communicator of claim 32 wherein said message editor is an e-mail editor.

34. The mobile communicator of claim 32 wherein said message editor is an SMS message editor.

35. The mobile communicator of claim 32 wherein said message editor is an MMS message editor.

36. The mobile communicator of claim 32 wherein said call facilitator (i) presents a scrollable display list of the predicted recipients, and (ii) designates a recipient as being a recipient of the message being composed by the user, in response to user selection of the recipient from the display list.

37. The mobile communicator of claim 32 wherein said call facilitator (i) presents a list of key codes assigned to each of the predicted recipients, and (ii) designates a recipient as being a recipient of the message being composed by the user, in response to user pressing of the recipient's assigned key code.

38. The mobile communicator of claim 32 wherein said call facilitator (i) presents a list of key codes assigned to each of the predicted recipients, and (ii) designates a recipient as being a recipient of the message being composed by the user, in response to user speaking of the recipient's assigned key code.

* * * * *